United States Patent
Wang et al.

(10) Patent No.: US 11,281,859 B2
(45) Date of Patent: Mar. 22, 2022

(54) DETERMINING STRUCTURE FROM A LANGUAGE BLOCK

(71) Applicant: LENOVO (Singapore) PTE. LTD., New Tech Park (SG)

(72) Inventors: Song Wang, Cary, NC (US); Roderick Echols, Chapel Hill, NC (US); Ryan Charles Knudson, Tampa, FL (US); John Weldon Nicholson, Cary, NC (US); Ming Qian, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 82 days.

(21) Appl. No.: 16/786,826

(22) Filed: Feb. 10, 2020

(65) Prior Publication Data
US 2021/0248320 A1     Aug. 12, 2021

(51) Int. Cl.
  *G06F 40/289*     (2020.01)
  *G06F 40/205*     (2020.01)
  *G06N 3/08*       (2006.01)

(52) U.S. Cl.
  CPC .......... *G06F 40/289* (2020.01); *G06F 40/205* (2020.01); *G06N 3/08* (2013.01)

(58) Field of Classification Search
  CPC ........ G06F 40/289; G06F 40/205; G06N 3/08
  USPC .......................................................... 704/9
  See application file for complete search history.

(56) References Cited

U.S. PATENT DOCUMENTS

| | | | | |
|---|---|---|---|---|
| 8,645,411 B1* | 2/2014 | Bandaru | ............... | G06F 40/114 |
| | | | | 707/769 |
| 9,298,700 B1* | 3/2016 | Jesensky | ............... | G06F 40/289 |
| 2007/0015464 A1* | 1/2007 | Disalvo | ................. | G06Q 30/02 |
| | | | | 455/41.1 |
| 2007/0015531 A1* | 1/2007 | Disalvo | ................. | H04H 60/33 |
| | | | | 455/550.1 |
| 2013/0332948 A1* | 12/2013 | Sibiriakova | .......... | G06Q 10/101 |
| | | | | 725/13 |
| 2014/0136188 A1* | 5/2014 | Wroczynski | .......... | G06F 40/284 |
| | | | | 704/9 |
| 2016/0170938 A1* | 6/2016 | Allen | ...................... | G06F 40/30 |
| | | | | 704/9 |
| 2016/0170956 A1* | 6/2016 | Allen | ...................... | G06F 40/20 |
| | | | | 704/9 |
| 2016/0170967 A1* | 6/2016 | Allen | ...................... | G10L 25/63 |
| | | | | 704/9 |
| 2016/0170969 A1* | 6/2016 | Allen | .................. | G06F 16/4393 |
| | | | | 704/9 |
| 2019/0005548 A1* | 1/2019 | Peppel | .................... | G06F 40/40 |
| 2019/0362220 A1* | 11/2019 | Yap | ........................ | G06N 3/063 |
| 2020/0125638 A1* | 4/2020 | Chemmengath | ...... | G06F 40/216 |
| 2020/0151773 A1* | 5/2020 | Peppel | ............... | G06Q 30/0271 |
| 2020/0192927 A1* | 6/2020 | Chawla | .................... | G06N 3/04 |
| 2021/0151046 A1* | 5/2021 | Nicholson | ........... | G10L 15/1815 |
| 2021/0173475 A1* | 6/2021 | Qian | .................... | G06F 3/04842 |

* cited by examiner

*Primary Examiner* — Edwin S Leland, III
(74) *Attorney, Agent, or Firm* — Kunzler Bean & Adamson

(57) ABSTRACT

For determining structure from a language block, a processor determines phrase tags from phrase vectors for phrases of a language block. The phrase tags specify a phrase function. The processor further determines structure tags for the phrases from the language block.

10 Claims, 6 Drawing Sheets

Since the distance from a GNSS satellite to a receiver can range from 20000 kilometers to more than 30000 kilometers, and a typical satellite transmitter has power of only a few tens of Watts, the satellite signal becomes very weak when it reaches the ground.

For example, the signal power of a GPS L1 signal is approximately -160dBw when it reaches the earth's surface, which is lower than a receiver's thermal noise level by about 20dB; therefore GNSS can be easily impacted by various types of external interferences

| Phrase 201 | Phrase Vector 203 | Phrase Tag 205 | Structure Tag 207 |
|---|---|---|---|
| Phrase 201 | Phrase Vector 203 | Phrase Tag 205 | Structure Tag 207 |
| ... | ... | ... | ... |
| Phrase 201 | Phrase Vector 203 | Phrase Tag 205 | Structure Tag 207 |

| Audience 231 | Audience Preference Structure 233 |
|---|---|
| Audience 231 | Audience Preference Structure 233 |
| ... | ... |
| Audience 231 | Audience Preference Structure 233 |

FIG. 2B

| Vector Encoding Model 250 | Tag Encoding Model 251 |
|---|---|

FIG. 2C

The signal power of a GPS L1 signal is approximately -160dBw when it reaches the earth's surface, which is lower than a receiver's thermal noise level by about 20dB; therefore GNSS can be easily impacted by various types of external interferences.

Since the distance from a GNSS satellite to a receiver can range from 20000 kilometers to more than 30000 kilometers, and a typical satellite transmitter has power of only a few tens of Watts, the satellite signal becomes very weak when it reaches the ground.

FIG. 6

DETERMINING STRUCTURE FROM A LANGUAGE BLOCK

FIELD

The subject matter disclosed herein relates to determining structure from a language block.

BACKGROUND

Language blocks have structure that influence communication.

BRIEF SUMMARY

An apparatus for determining structure from a language block is disclosed. The apparatus includes a processor and a memory that stores code executable by the processor. The processor determines phrase tags from phrase vectors for phrases of a language block. The phrase tags specify a phrase function. The processor further determines structure tags for the phrases from the language block. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is text illustrating one embodiment of a language block;

FIG. 2A is a schematic block diagram illustrating one embodiment of phrase data;

FIG. 2B is a schematic block diagram illustrating one embodiment of audience data;

FIG. 2C is a schematic block diagram illustrating one embodiment of encoding models;

FIG. 6 is text illustrating one embodiment of a language block with modified structure.

DETAILED DESCRIPTION

Figure 3:
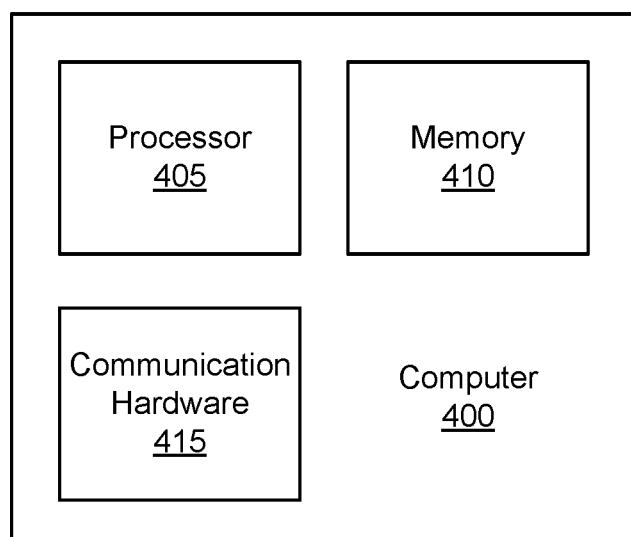
FIG. 3 is a schematic block diagram illustrating one embodiment of a computer.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PUP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is text illustrating one embodiment of a language block 100. In the depicted embodiment, the language block 100 is text. The language block 100 may also be audio. The language block 100 includes a plurality of phrases 201. Each phrase 201 may perform a specific phrase function. For example, a phrase 201 may present one or more main points. In addition, another phrase 201 may present details for a main point.

The phrases 201 are organized in a structure. As used herein, structure refers to an order that the phrases 201 and/or phrase functions appear in the language block 100. The phrase functions and corresponding phrases 201 may be ordered to achieve the desired organizational structure. For example, phrases 201 with phrase functions of presenting details may be ordered first and other phrases 201 with phrase functions of presenting main points may be ordered last to achieve an inductive structure. Similarly, phrases 201 with phrase functions of presenting main points may be ordered first and other phrases 201 with phrase functions of presenting details may be ordered later to achieve a deductive structure.

The structure may be selected based on a purpose and/or audience. Unfortunately, a language block 100 that is originally directed to a first purpose and/or audience may be subsequently redirected to a second purpose and/or audience. The embodiments described herein determine phrase tags and structure tags for the language block 100. The phrase tags and structure tags may be used to modify the structure of the language block 100 based on an audience preference. As a result, the phrases 201 of the language block 100 may be communicated in a structure desired by the audience.

FIG. 2A is a schematic block diagram illustrating one embodiment of phrase data 200. The phrase data 200 may describe the phrases 201 of the language block 100. The phrase data 200 may be organized as a data structure in a memory. In the depicted embodiment, the phrase data 200 includes the phrase 201, a phrase vector 203, a phrase tag 205, and a structure tag 207 for each phrase 201 in the language block 100.

The phrase 201 may be a copy of the phrase 201 from the language block 100. In one embodiment, the phrase 201 is a transcription of the audio phrase 201 from the language block 100.

The phrase vector 203 is an encoding of the phrase 201. In one embodiment, an encoding model encodes the phrase vector 203 from the phrase 201. The phrase vector 203 may comprise a plurality of values that describes the phrase 201.

The phrase tag 205 specifies the phrase function for the phrase 201. The phrase tag 205 may be determined from the phrase vector 203. Table 1 illustrates some exemplary phrase tags 205.

TABLE 1

Summary
Declarative Main Point
Declarative Detail
Interrogative Main Question
Interrogative Detailed Question
Imperative Main Directive
Imperative Detail
Exclamatory The structure tag 207 may specify an order of the phrase 201 in the language block 100. In one embodiment, the structure tag 207 specifies the phrase's order of appearance in the language block 100. For example, a first phrase 201 may have a structure tag value of one.

In addition, the structure tag 207 may specify a relative position of the phrase 201 within the language block 100. For example, the structure tag 207 may specify that a phrase 201 appears within a first half of the language block 100.

In one embodiment, the structure tag 207 specifies a relational position of the phrase 201. For example, the structure tag 207 may specify that a given phrase 201 follows a first phrase 201.

In a certain embodiment, the structure tag 207 is a Null structure tag 207. The Null structure tag 207 may indicate that a phrase 201 is not included in a language block 100.

FIG. 2B is a schematic block diagram illustrating one embodiment of audience data 230. The audience data 230 may specify an audience preference structure 233 for each of a plurality of audiences 231. The audience data 230 may be organized as a data structure in a memory. The audience data 230 includes the audience 231 and the audience preference structure 233.

The audience 231 specifies the audience type. The audience type may be a cultural group. For example, the audience 231 may specify an American cultural group. The audience 231 may be a culture group of a group selected from the group consisting of a North Asian cultural group, a South Asian cultural group, a North American cultural group, a South American cultural group, a European cultural group, a Middle Eastern cultural group, and an African cultural group.

The audience type may also be a language group. For example, the audience 231 may specify a Chinese language group. The audience 231 may be a language group selected from the group consisting of Chinese, Japanese, Korean, Hindu, Farsi, Arabic, Russian, German, French, English, Swahili, Spanish, and Portuguese.

In addition, the audience type may be a professional group. For example, the audience 231 may specify a journalist professional group. The audience 231 may specify a professional group selected from the group consisting of an engineering group, a managerial group, a finance group, a medical group, a legal group, an education group, and an entertainment group.

In one embodiment, the audience type may be a relational group. For example, the audience 231 may specify a subordinate relational group or a superior relational group. The audience type may also be an age group. For example, the audience 231 may specify an age group selected from the group consisting of a child age group, a youth age group, a young adult age group, a middle age group, and a senior age group.

The audience preference structure 233 may specify structure that is preferred by the corresponding audience 231. The audience preference structure 233 may be selected from the group consisting of an inductive structure, a deductive structure, a technical structure, a journalistic structure, an artistic structure, a directive structure, and a suggestive structure.

The audience preference structure 233 may specify in order that phrases 201 should appear within a language block 100 based on phrase tag 205. Table 2 shows an exemplary audience preference structure 233 for an inductive structure, wherein the order of phrase tags 205 is specified.

TABLE 2

Interrogative Detailed Question
Interrogative Main Question
Declarative Detail
Declarative Main Point
Summary Table 3 shows an exemplary audience preference structure 233 for a deductive structure, wherein the order of phrase tags 205 is specified.

TABLE 3

Summary
Declarative Main Point
Declarative Detail
Interrogative Main Question
Interrogative Detailed Question FIG. 2C is a schematic block diagram illustrating one embodiment of the encoding models 250/251. The encoding models 250/251 maybe organized as a data structure in a memory and/or neural network. The vector encoding model 250 may be trained to encode the phrase vector 203 from the phrase 201. In a certain embodiment, the encoding model 250 is an encoder model. In addition, the encoding model 250 may be an encoder-decoder model.

The tag encoding model 251 may be trained to encode the phrase tag 205 from the phrase vector 203. Alternatively, the tag encoding model 251 may be trained to encode the phrase tag 205 from the phrase 201.

FIG. 3 is a schematic block diagram illustrating one embodiment of a computer 400. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices. In one embodiment, the processor 405 hosts the vector encoding model 250 and/or tag encoding model 251.

Figure 4:
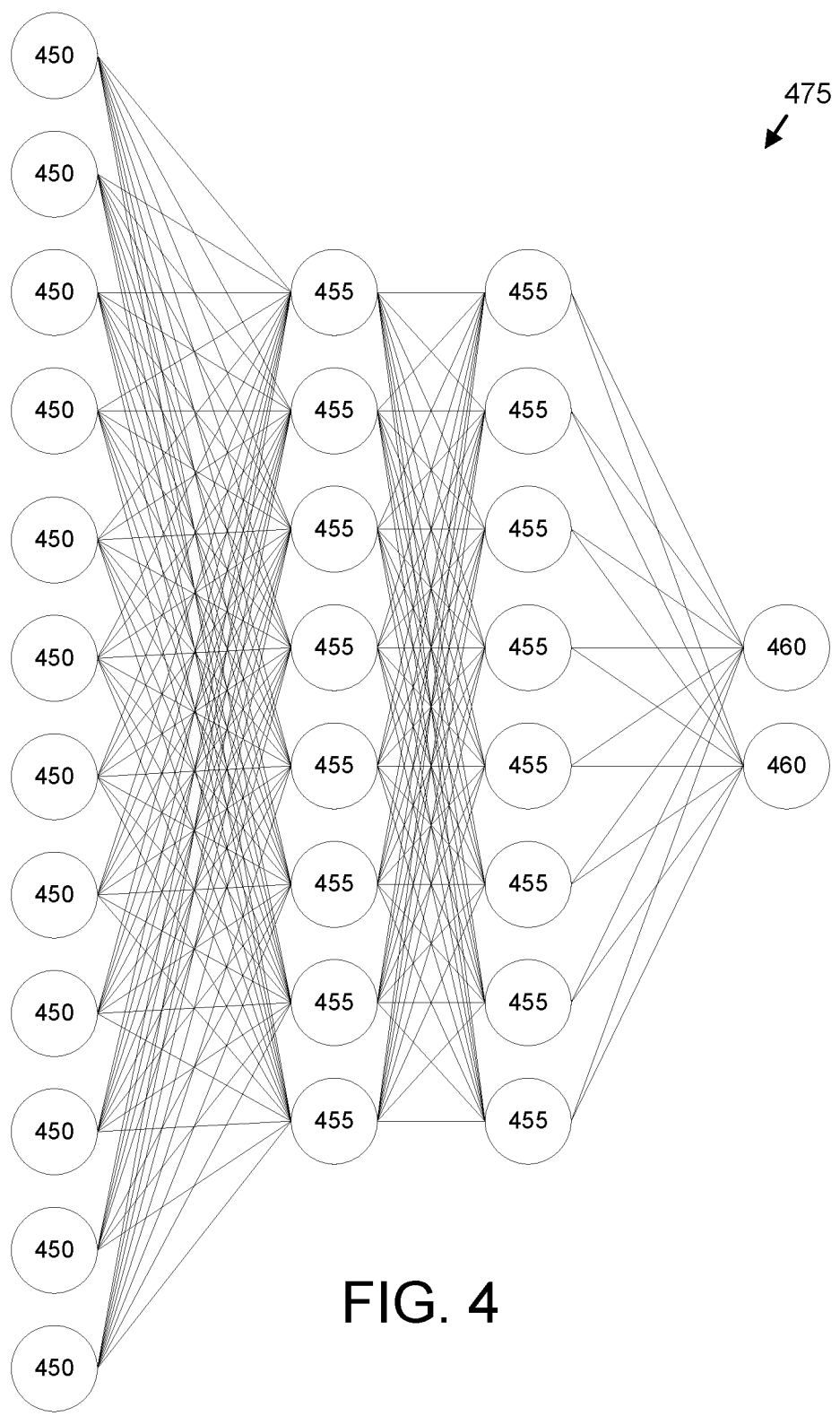
FIG. 4 is a schematic block diagram illustrating one embodiment of a neural network.

FIG. 4 is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, long short term memory neural network, and the like.

The neural network 475 may be trained with training data. The training data may include a plurality of phrases 201. The neural network 475 may be trained using one or more learning functions while applying the training data to the input neurons 450 and known result values for the output neurons 460. Subsequently, the neural network 465 may receive actual data at the input neurons 450 and make predictions at the output neurons 460 based on the actual data. The actual data may include the phrases 201 from the language block 100. The neural network 475 may be hosted on one or more processors 405. In addition, a neural network 475 may host the vector encoding model 250 and/or the tag encoding model 251.

Figure 5:
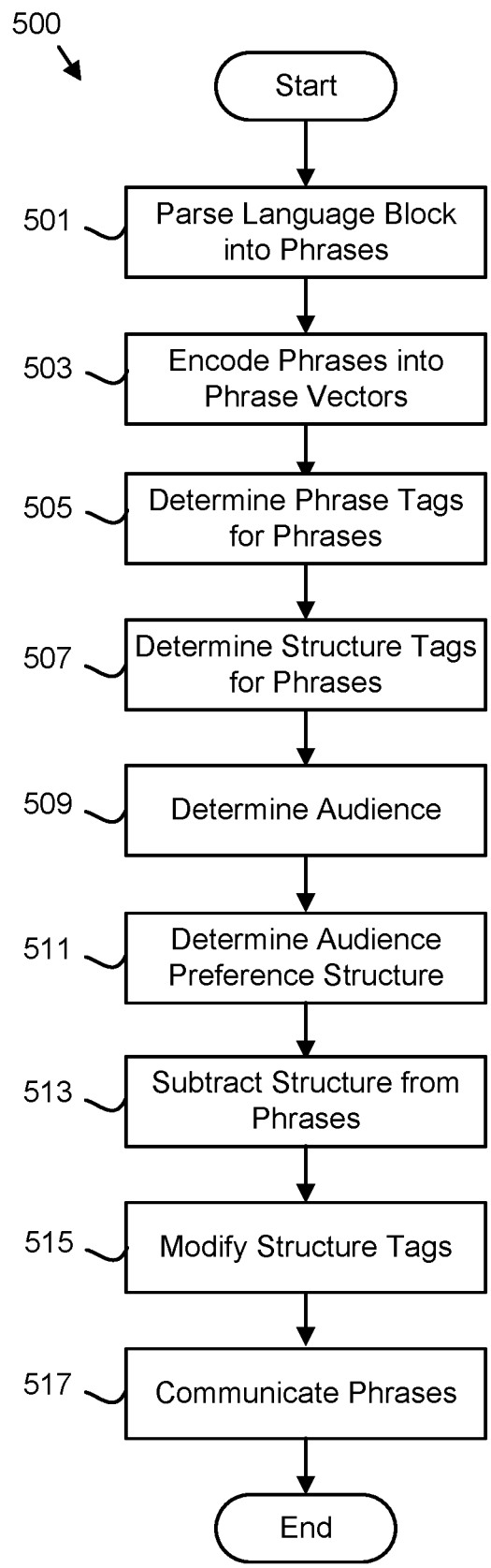
FIG. 5 is a schematic flow chart diagram illustrating one embodiment of a structure determination method.

FIG. 5 is a schematic flow chart diagram illustrating one embodiment of a structure determination method 500. The method 500 may determine the phrase tags 205 and the structure tag 207 for the phrases 201 of the language block 100. The method 500 may be performed by the processor 405 and/or neural network 475.

The method 500 starts, and in one embodiment, the processor 405 parses 501 the language block 100 into the phrases 201. Each sentence may be parsed 501 into a phrase 201. In addition, each sentence phrase 201 may be further parsed 501 into a plurality of phrases 201. The sentence phrase 201 may be parsed 501 into the plurality of phrases 201 based on parts of speech.

The processor 405 may encode 503 the phrases 201 into the phrase vectors 203. In one embodiment, the vector encoding model 250 encodes 503 the phrases 201 into the phrase vectors 203.

The processor 405 may determine 505 the phrase tags 205 from the phrase vectors 203 for the phrases 201 of the language block 100. The phrase tags 205 may be determined by applying a disambiguation process to the phrase vectors 203. In one embodiment, the tag encoding model 251 determines 507 the phrase tags 205. Each phrase tag 205 may specify a phrase function of the corresponding phrase 201.

The processor 405 may further determine 507 the structure tags 207 for the phrases 201 from the language block 100. The structure tags 207 may be determined 507 based on the order of the phrases 201 within the language block 100. For example, the structure tags 207 may initially reflect the order of the phrases 201 within the language block 100.

In addition, the structure tags 207 may be modified based on a relative position and/or relational position of phrases 201 within the language block 100. For example, the structure tags 207 may record a relational position to a parent phrase 201.

The processor 405 may determine 509 the audience 231 for the language block 100. The audience 231 may be specified by a user. In addition, the processor 405 may determine 509 the audience 231 from a list of intended recipients.

The processor 405 may further determine 511 the audience preference structure 233 based on the audience 231. The audience preference structure 233 may be determined 511 by using the audience 231 as an index to the audience data 230.

The processor 405 may subtract 513 the structure tags 207 from the phrases 201. In one embodiment, each structure tag 207 is written with a Null value. Alternatively, order values are overwritten with the Null value. In one embodiment, relative positions and/or relational positions are maintained.

The processor 405 may modify 515 the structure tags 207 based on the audience preference structure 233 and the phrase tags 205. In one embodiment, the structure tags 207 are assigned a new order based on the phrase tags 205. For example, the processor 405 may modify 515 the structure tags 207 for each phrase 201 to reflect the order of the audience preference structure 233 based on the phrase tags 205.

The processor 405 may communicate 517 the phrases 201 based on the modified structure tags 207 and the method 500 ends. In one embodiment, the phrases 201 are generated in an order specified by the modified structure tags 207. In addition, relative positions may be maintained. In one embodiment, relational positions are maintained.

FIG. 6 is text illustrating one embodiment of a language block 100 with modified structure. In the depicted embodiment, the phrases 201 of FIG. 1 are communicated based on modified structure tags 207. As a result, the order of the phrases 201 is changed.

The embodiments determine phrase tags 205 and structure tags 207 for phrases 201 of a language block 100. The embodiments further modify the structure tags 207 based on the audience preference structure 233 to better reflect the preferences of the target audience 231. The phrases 201 are communicated to the audience 231 based on the modified structure tags 207 to improve communication to the audience 231. In addition, the embodiments improve the function of the computer 400 and/or neural network 475 in providing the language block 100 to the audience 231.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor,
   a memory that stores code executable by the processor to:
   encode phrase of a language block into phrase vectors using a neural network;
   determine phrase tags from the phrase vectors, wherein the phrase tags specify a phrase function;
   determine structure tsp for the phrases from the language block;
   determine an audience for the language block;

determine an audience preference structure based on the audience;

modify the structure tags based on the audience preference structure and the phrase tags, wherein the audience preference structure is selected from the group consisting of an inductive structure, a deductive structure, a technical structure, a journalistic structure, an artistic structure, a directive structure, and a suggestive structure; and communicate the phrases based on the modified structure taps.

2. The apparatus of claim 1, wherein the phrase tags are determined by applying a disambiguation process to the phrase vectors.

3. The apparatus of claim 1, wherein the code is further executable by the processor to parse the language block into the phrases.

4. The apparatus of claim 1, wherein the code is further executable by the processor to subtract the structure tags from the phrases.

5. A method comprising:
encoding phrases of a language block into phrase vectors using a neural network;
determining, by use of processor, phrase tags from the phrase vectors, wherein the phrase tags specify a phrase function;
determining structure tags for the phrases from the language block;
determining an audience for the language block;
determining an audience preference structure based on the audience;
modifying the structure tags based on the audience preference structure and the phrase tags, wherein the audience preference structure is selected from the group consisting of an inductive structure, a deductive structure, a technical structure, a journalistic stricture, an artistic structure, a directive structure, and a suggestive structure; and
communicating the phrases based on the modified structure tags.

6. The method of claim 5, wherein the phrase tags are determined by applying a disambiguation process to the phrase vectors.

7. The method of claim 5, the method further comprising parsing the language block into the phrases.

8. The method of claim 5, the method further comprising subtracting the structure tags from the phrases.

9. A program product comprising a computer readable storage medium that stores code executable by a processor, the executable code comprising code to:
encode phrases of a language block into phrase vectors using neural network,
determine phrase tags from the phrase vectors, wherein the phrase tags specify a phrase function;
determine structure tags for the phrases from the language block;
determine an audience preference structure based on the audience;
modify the structure tags based on the audience preference structure and the phrase tags, wherein the audience preference structure is selected from the group consisting of an inductive structure, a deductive structure, a technical structure, a journalistic structure, an artistic structure, a directive structure, and a suggestive structure; and
communicate the phrases based on the modified structure tags.

10. The program product of claim 9, wherein the phrase tags are determined by applying a disambiguation process to the phrase vectors.

* * * * *